US011869356B2

(12) United States Patent
Kurehashi et al.

(10) Patent No.: US 11,869,356 B2
(45) Date of Patent: Jan. 9, 2024

(54) COMMUNICATION CONTROL APPARATUS, VEHICLE, COMPUTER-READABLE STORAGE MEDIUM, AND COMMUNICATION CONTROL METHOD

(71) Applicant: HONDA MOTOR CO., LTD., Tokyo (JP)

(72) Inventors: Takahiro Kurehashi, Saitama (JP); Shigeru Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/472,681

(22) Filed: Sep. 12, 2021

(65) Prior Publication Data
US 2022/0084409 A1   Mar. 17, 2022

(30) Foreign Application Priority Data

Sep. 15, 2020  (JP) .................... 2020-154869

(51) Int. Cl.
*G08G 1/16*       (2006.01)
*G06V 20/58*      (2022.01)
(Continued)

(52) U.S. Cl.
CPC ........... *G08G 1/166* (2013.01); *G06V 20/584* (2022.01); *G06V 40/103* (2022.01); *G08G 1/161* (2013.01); *H04W 4/46* (2018.02)

(58) Field of Classification Search
CPC ...... G08G 1/166; G08G 1/161; G06V 20/584; G06V 40/103; H04W 4/46
See application file for complete search history.

(56) References Cited

U.S. PATENT DOCUMENTS 10,373,500 B1 *  8/2019  Chan ................... H04W 84/00
2010/0099353 A1   4/2010  Komori
(Continued)

FOREIGN PATENT DOCUMENTS

CN      110430401 A      11/2019
CN      113362646 A       9/2021
(Continued)

OTHER PUBLICATIONS

Office Action issued for counterpart Chinese Application 202110903579.2, issued by The State Intellectual Property Office of People's Republic of China dated Apr. 27, 2023.
(Continued)

*Primary Examiner* — Curtis A Kuntz
*Assistant Examiner* — James E Munion

(57) ABSTRACT

A communication control apparatus includes an image acquisition unit configured to acquire an image from an image capturing unit installed in a movable object, a reception control unit configured to control reception of risk area information including location information from another movable object, a determination unit configured to determine whether a notification target is present in a region based on the location information included in the risk area information based on the image, and a transmission control unit configured to control transmission of a determination result of the determination unit to the other movable object.

20 Claims, 8 Drawing Sheets

(51) Int. Cl.
   *G06V 40/10*   (2022.01)
   *H04W 4/46*    (2018.01)

(56)             References Cited

U.S. PATENT DOCUMENTS

2020/0349841 A1*  11/2020  Zerod .................. B60W 50/14
2020/0372792 A1*  11/2020  Li ....................... G06V 10/764
2021/0049910 A1*   2/2021  Wood .................. G08G 1/0116
2021/0281968 A1    9/2021  Kurehashi

FOREIGN PATENT DOCUMENTS

DE      102004037733 A1      3/2006
JP          2006163637    *  6/2006
JP          2006163637 A     6/2006
JP          2008225786 A     9/2008
JP          2008299676 A    12/2008
JP          2010079565 A  *  4/2010
JP          2010079565 A     4/2010
JP          2017027525    *  2/2017
JP          2017027525 A     2/2017
JP          2018195159 A  * 12/2018

OTHER PUBLICATIONS

Office Action issued for counterpart Japanese Application No. 2020-154869, transmitted from the Japanese Patent Office dated Oct. 3, 2023 (drafted on Sep. 26, 2023).

* cited by examiner

COMMUNICATION CONTROL APPARATUS, VEHICLE, COMPUTER-READABLE STORAGE MEDIUM, AND COMMUNICATION CONTROL METHOD

The contents of the following Japanese patent application are incorporated herein by reference:

Japanese Patent Application NO. 2020-154869 filed on Sep. 15, 2020.

BACKGROUND

1. Technical Field

The present invention relates to a communication control apparatus, a vehicle, a computer-readable storage medium, and a communication control method.

2. Related Art

Patent document 1 describes "a communication terminal for vehicles which is configured to transmit a search signal and also receive a response signal". Patent document 2 describes "image recognition means configured to recognize a pedestrian from an image in the vicinity of a vehicle".

LIST OF CITED REFERENCES

Patent Documents

[Patent document 1] Japanese Unexamined Patent Application, Publication No. 2017-27525
[Patent document 2] Japanese Unexamined Patent Application, Publication No. 2006-163637

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
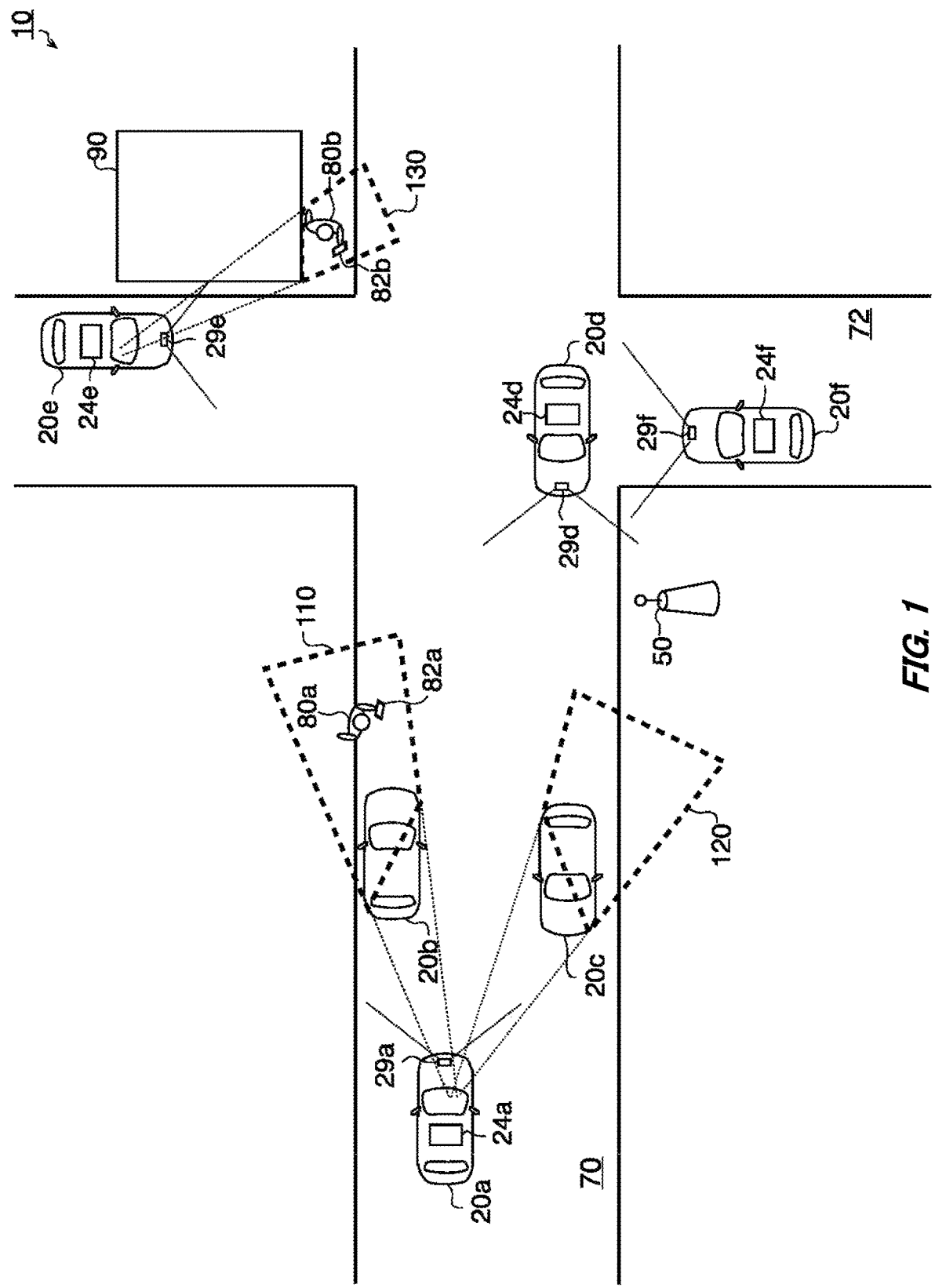
FIG. 1 schematically illustrates a usage scene of a warning system 10.

FIG. 1 schematically illustrates a usage scene of a warning system 10. The warning system 10 includes a vehicle 20a, a vehicle 20b, a vehicle 20c, a vehicle 20d, a vehicle 20e, and a vehicle 20f, and a terminal 82a and a terminal 82b.

According to the present embodiment, the vehicle 20a, the vehicle 20b, the vehicle 20c, the vehicle 20d, the vehicle 20e, and the vehicle 20f may be collectively referred to as the "vehicle 20". The vehicle 20 is one example of the "vehicle 20". In addition, the terminal 82a and the terminal 82b are terminals respectively possessed by a pedestrian 80a and a pedestrian 80b. According to the present embodiment, the pedestrian 80a and the pedestrian 80b may be collectively referred to as the "pedestrian 80". In addition, the terminals 82a and 82b may be collectively referred to as the "terminal 82".

The vehicle 20a includes a sensor 29a and an information processing apparatus 24a. The sensor 29a is configured by including a camera. The information processing apparatus 24a includes a processing function of information acquired by the sensor 29a, and a communication function. Note that according to the present embodiment, any of suffixes "a" to "f" of reference signs of the vehicles 20 is assigned to an end of a reference sign of the component included in the vehicle 20, so that the components (for example, the sensors 29 and the information processing apparatuses 24) are distinguished to be included in which of the vehicles 20.

In FIG. 1, the vehicle 20a is a vehicle traveling along a road 70. The vehicle 20b is a vehicle parked on the road 70. For the vehicle 20a, an area 110 in an advancing direction of the vehicle 20a relative to the parked vehicle 20b is an area where it is difficult to be visually recognized from a location of the vehicle 20a. In addition, the vehicle 20c is a vehicle traveling along an oncoming lane of the road 70 when viewed from the vehicle 20a. An area 120 in the advancing direction of the vehicle 20a relative to the vehicle 20c is an area where it is difficult to be visually recognized from the location of the vehicle 20a. Therefore, the information processing apparatus 24a detects the area 110 and the area 120 that are not on a line of sight from the vehicle 20a as a risk area from an image in the advancing direction which is acquired by the sensor 29a. The information processing apparatus 24a transmits risk area information including location information of the areas 110 and 120 by wireless communication.

In FIG. 1, the vehicle 20d is an oncoming vehicle of the vehicle 20a, and is a vehicle traveling in a location where the area 110 and the area 120 can be visually recognized. When the risk area information transmitted from the vehicle 20a is received, an information processing apparatus 24d of the vehicle 20d judges whether a pedestrian is present in each of the area 110 and the area 120 from an image acquired by a sensor 29d. When it is detected that the pedestrian 80a is present in the area 110 from the image acquired by the sensor 29d, the information processing apparatus 24d transmits response information indicating the presence of the pedestrian in the area 110 to the vehicle 20a by the wireless communication. In addition, when it is detected that the pedestrian is absent in the area 120 from the image acquired by the sensor 29d, the information processing apparatus 24d transmits the response information indicating the absence of the pedestrian in the area 120 to the vehicle 20a by the wireless communication. In addition, when it is judged that a current location of the terminal 82a is within the area 110, the terminal 82a transmits the response information indicating the presence of the terminal 82a in the area 110 to the vehicle 20a by the wireless communication. In addition, the terminal 82a outputs warning information for the pedestrian 80a.

In the vehicle 20a, when the response information indicating the presence of the pedestrian in the area 110 is received from the vehicle 20d, the information processing apparatus 24a performs warning display. In addition, when the response information is received from the terminal 82a, the information processing apparatus 24a performs the warning display.

In addition, in FIG. 1, it is difficult to visually recognize an area 130 from a location of the vehicle 20e traveling on the road 72, for example, since a building 90 is an obstruction. For this reason, an information processing apparatus 24e of the vehicle 20e determines the area 130 as the risk area, and transmits the risk area information including the location information of the area 130 by the wireless communication.

In FIG. 1, the vehicle 20f is an oncoming vehicle of the vehicle 20e, and is a vehicle stopping in a location where the area 130 can be visually recognized. When the risk area information transmitted from the vehicle 20e is received, an information processing apparatus 24f of the vehicle 20f judges whether a pedestrian is present in the area 130 from an image acquired by a sensor 29f. When it is detected that the pedestrian 80b is present in the area 130 from the image acquired by the sensor 29f, the information processing apparatus 24f transmits the response information indicating the presence of pedestrian in the area 130 to the vehicle 20e by the wireless communication. In addition, when it is judged that a current location of the terminal 82b is within the area 130, the terminal 82b transmits the response information indicating the presence of the terminal 82b in the area 130 to the vehicle 20e by the wireless communication. In addition, the terminal 82b outputs the warning information for the pedestrian 80b.

In the vehicle 20e, when the response information indicating the presence of the pedestrian in the area 130 is received from the vehicle 20f, the information processing apparatus 24e performs the warning display. In addition, when the response information is received from the terminal 82b, the information processing apparatus 24e performs the warning display.

In this manner, the information processing apparatus 24 determines a non line of sight area corresponding to a blind corner from its own vehicle as the risk area, and transmits the risk area information including the location information of the risk area to another vehicle by the wireless communication. When the risk area information is received, the other vehicle judges whether a pedestrian is present in the risk area, and transmits the response information indicating the presence of the pedestrian in the risk area by the wireless communication. In addition, when its own terminal is present in the risk area, the terminal 82 transmits the response information by the wireless communication. When the response information from the terminal 82 of the pedestrian or the other vehicle is received, the information processing apparatus 24 performs the warning display for an occupant of the vehicle 20. With this configuration, it is possible to appropriately perform a notification of the risk area that cannot be recognized by the vehicle 20 or the pedestrian 80. The risk area is a recognition of a state related to an external environment recognized by the vehicle 20 or the information processing apparatus 24. The risk area may be, for example, an area where there is a risk for the pedestrian 80 or the vehicle 20. The risk area may be, for example, an area where a safety check is to be performed for the pedestrian 80 or the vehicle 20.

Note that communication between the information processing apparatus 24 and the terminal 82, and the information processing apparatus 24 of the other vehicle 20 is executed by direct communication. For example, a communication apparatus 290 performs the direct communication with the terminal 82 and the information processing apparatus 24 of the other vehicle 20 by short distance direct communication in Cellular-V2X. Examples of the short distance direct communication in Cellular-V2X include a communication system such as LTE-V2X PC5 or 5G-V2X PC5 (according to the present embodiment, which will be abbreviated as "PC5"). A mode using Wi-Fi (registered trademark) or dedicated short range communications (DSRC) may be adopted as the direct communication. The information processing apparatus 24 may perform the direct communication via a base station 50 such as an MEC server. Any direct communication system such as Bluetooth (registered trademark) other than Cellular-V2X or DSRC (registered trademark) may be adopted as the direct communication. The information processing apparatus 24 may perform the direct communication with the terminal 82 and the information processing apparatus 24 of the other vehicle 20 using a communication infrastructure included in intelligent transport systems (ITS).

Note that according to the present embodiment, for ease of the description, a case will be considered where it is judged on whether a pedestrian is present in a risk area. The pedestrian refers to a person who can make a passage on a road by a method without relying on a vehicle. The pedestrian includes a person who makes a passage on a road using a wheel chair or the like. However, it may be judged on whether not only the pedestrian but also any movable object such as a person other than the pedestrian or another vehicle is present in the risk area. The person other than the pedestrian may include a person aboard a stopped vehicle.

Figure 2:
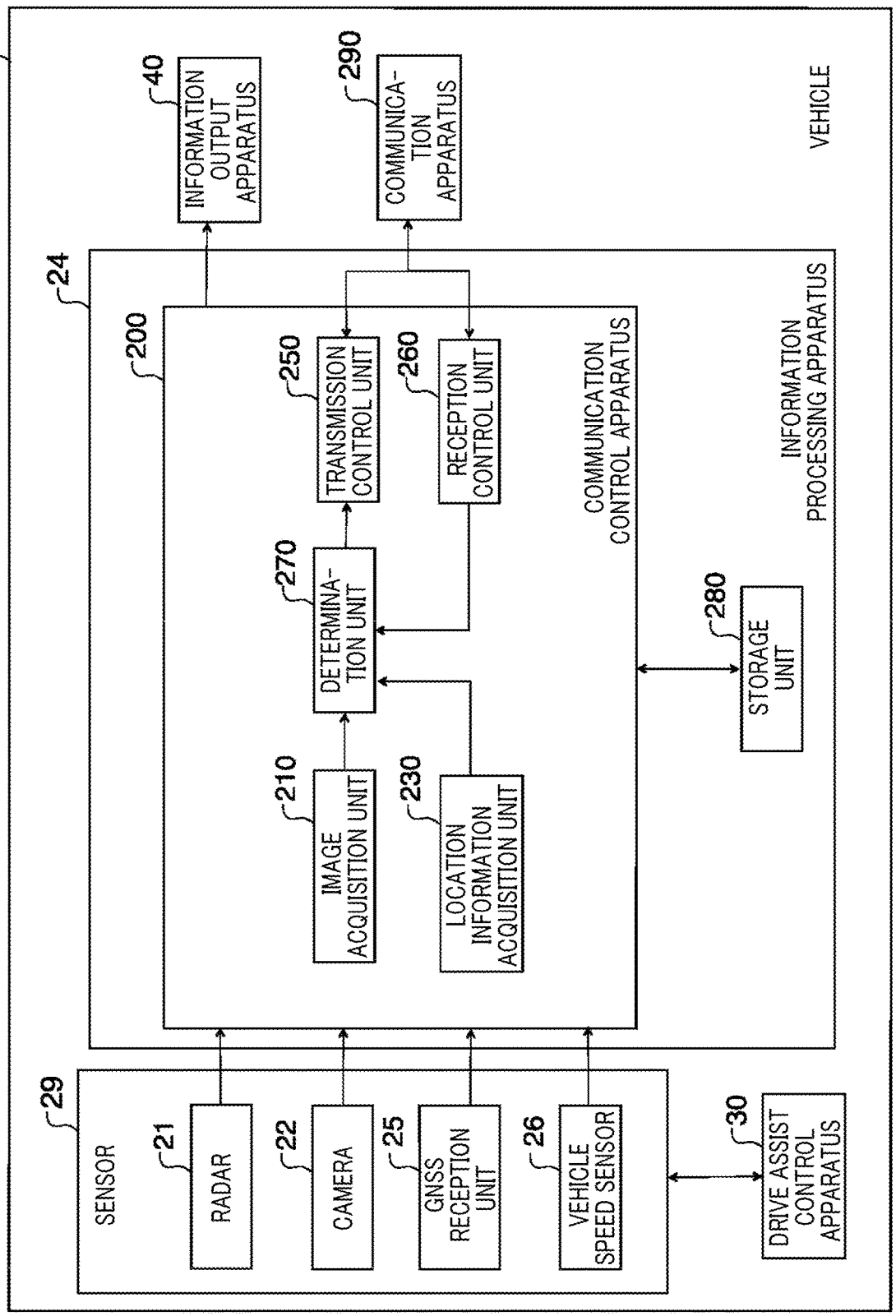
FIG. 2 illustrates a system configuration of a vehicle 20.

FIG. 2 illustrates a system configuration of the vehicle 20. The vehicle 20 includes the sensor 29, a drive assist control apparatus 30, the information processing apparatus 24, the communication apparatus 290, and an information output apparatus 40.

The sensor 29 includes a radar 21, a camera 22, a GNSS reception unit 25, and a vehicle speed sensor 26. The radar 21 may be a LiDAR, a millimeter wave radar, or the like. The GNSS reception unit 25 is configured to receive radio waves transmitted from a GNSS satellite. The GNSS reception unit 25 generates information indicating a current location of the vehicle 20 based on a signal received from the GNSS satellite. The camera 22 is configured to generate image information by capturing an image of a surrounding of the vehicle 20. For example, the camera 22 generates the image information by capturing an image in the advancing direction of the vehicle 20. The camera 22 may be a single-lens camera. The camera 22 may be a multi-lens camera, and may be a camera that acquires distance information to an object. Note that the sensor 29 may include a location sensor such as an odometer, or an inertial measurement unit (IMU) such as an acceleration sensor or an orientation sensor.

The drive assist control apparatus 30 is configured to perform drive assist of the vehicle 20 using information detected by the sensor 29. The drive assist control apparatus 30 may be achieved by an ECU having a function of advanced driver-assistance systems (ADAS).

The communication apparatus 290 plays a role of performing the direct communication between the terminal 82 and the other vehicle 20. For example, the communication apparatus 290 plays a role of performing the wireless communication based on PC5.

The information processing apparatus 24 includes a communication control apparatus 200 and a storage unit 280. The communication control apparatus 200 is achieved, for example, by an arithmetic processing apparatus including a processor. The storage unit 280 is achieved by including a nonvolatile storage medium. The communication control apparatus 200 performs processing using information stored in the storage unit 280. The communication control apparatus 200 may be achieved by an electronic control unit (ECU) including a microcomputer provided with a CPU, a ROM, a RAM, an I/O, a bus, and the like.

The communication control apparatus 200 includes an image acquisition unit 210, a detection unit 220, a location information acquisition unit 230, a determination unit 270, a transmission control unit 250, and a reception control unit 260. Note that a functional configuration of the communication control apparatus 200 illustrated in FIG. 2 is a functional configuration that plays a role of a functional part of the information processing apparatus 24d in the vehicle 20d and the information processing apparatus 24f in the vehicle 20f which are described with reference to FIG. 1.

The location information acquisition unit 230 is configured to acquire the location information of the vehicle 20. For example, the location information acquisition unit 230 acquires the location information of the vehicle 20 from the GNSS reception unit 25. The image acquisition unit 210 is configured to acquire an image of an outside of the vehicle 20. The image acquisition unit 210 acquires an image captured by the camera 22 installed in the vehicle 20.

The reception control unit 260 is configured to control reception of risk area information including location information from the other vehicle 20. The location information indicates an area where the presence of a notification target cannot be recognized from the other vehicle 20. For example, the location information is location information of an area (non line of sight area) where occlusion is generated due to shielding by an object such as a building or the other vehicle 20 that is stopping when viewed from a location of the other vehicle 20. Note that the notification target refers to a target of which the other vehicle 20 or the like is notified regarding the presence in the risk area. The transmission control unit 250 is configured to control transmission of a determination result of the determination unit 270 to another movable object. The notification target may include at least one of a person and a vehicle. According to the present embodiment, the notification target is the pedestrian 80.

The determination unit 270 is configured to determine whether the notification target is present in a region based on the location information included in the risk area information based on the image acquired from the camera 22. For example, the determination unit 270 may extract an image region showing the risk area from the image captured by the camera 22 based on the location information of the vehicle 20 acquired by the location information acquisition unit 230, an angle of view of the camera 22, and an orientation of the vehicle 20, and detect the pedestrian 80 from the extracted image region. The determination unit 270 may specify a geographic location of the pedestrian 80 detected from the image region based on the distance information detected from the radar 21 or an multi-viewpoint image and the location information of the vehicle 20. When the specified geographic location of the pedestrian 80 is included in the risk area indicated by the location information, the determination unit 270 may determine that the pedestrian 80 is present in the risk area.

Note that the location information may be a plurality of pieces of coordinate information indicating an area where it is to be determined on whether the notification target is present. The location information may be location information indicating a geographic location. When the risk area has a quadrangle shape, the plurality of pieces of coordinate information may be coordinate information of vertices of the quadrangle. The determination unit 270 may determine whether a notification target is present in an area including the plurality of pieces of coordinate information.

The location information may include coordinate information indicating the area where it is to be determined on whether the notification target is present and distance information from the coordinate information. For example, the location information may include coordinate information of a specific point of the risk area and distance information representing a size of the risk area using the point as a reference. The determination unit 270 may determine whether the notification target is present in an area set by the coordinate information and the distance information.

The risk area information may include designation information indicating a movable object that is to transmit a determination result. The designation information may include information at least one of a location, an orientation, an advancing direction, and a type of the movable object that is to transmit the determination result. When it is judged that the determination result is to be transmitted based on the designation information, the determination unit 270 may determine whether the notification target is present in the region based on the location information included in the risk area information.

Note that the information output apparatus 40 is an apparatus configured to output the warning information. The information output apparatus 40 may have a function of a human machine interface (HMI). The information output apparatus 40 may include a head-up display or a navigation system. The information output apparatus 40 may be a mobile terminal possessed by an occupant of the vehicle 20. The information output apparatus 40 may be a sound output apparatus configured to output the warning information using a sound. When the response information is received from the other the vehicle 20, the information output apparatus 40 is configured to control display of information based on the response information. For example, when the response information indicating the presence of the notification target in the vicinity of the risk area is received from the other the vehicle 20, the information output apparatus 40 outputs the warning information as notification information.

Figure 3:
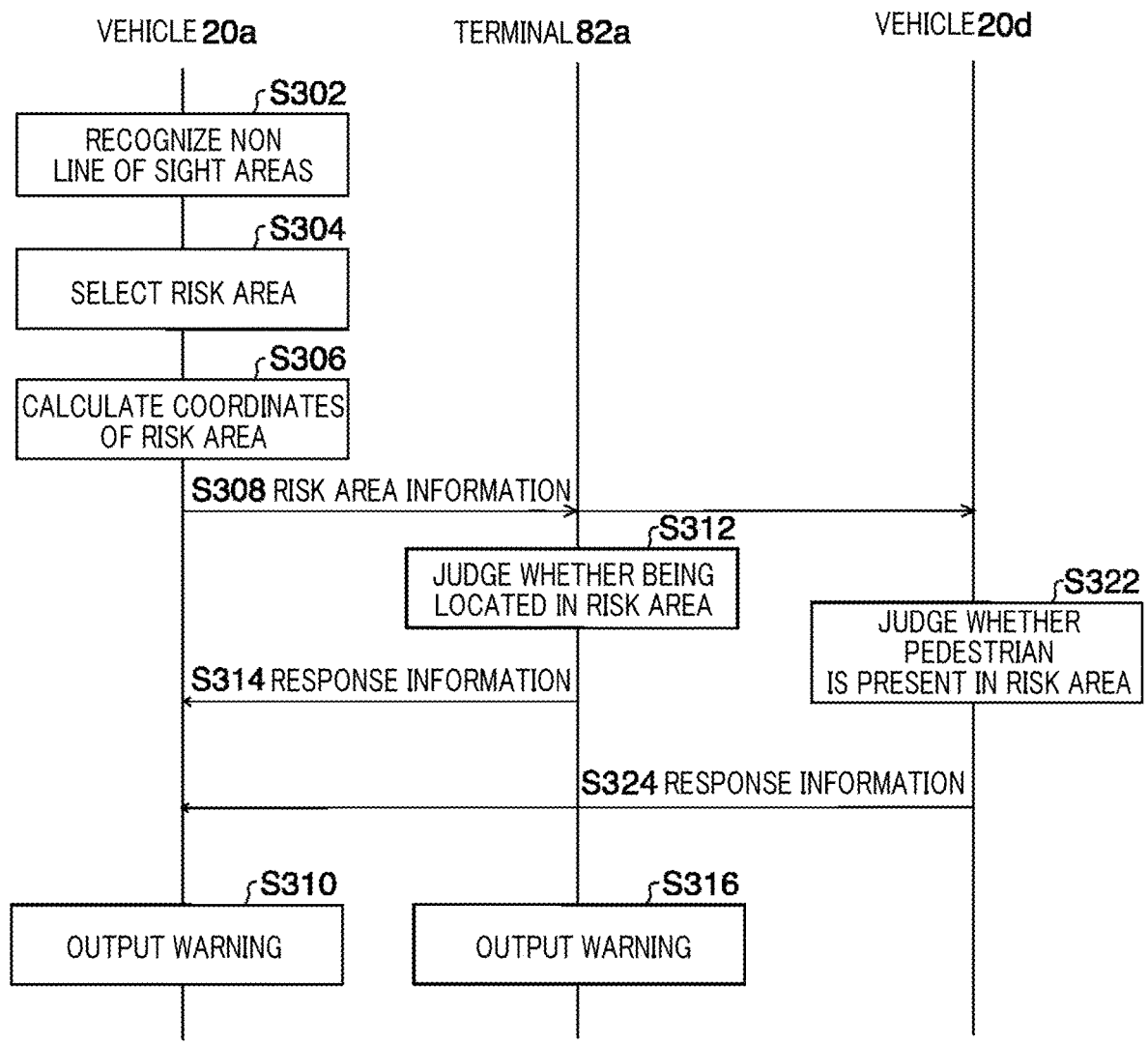
FIG. 3 schematically illustrates a flow of processing executed by a vehicle 20a, a terminal 82a, and a vehicle 20d.

FIG. 3 schematically illustrates a flow of processing executed by the vehicle 20a, the terminal 82a, and the vehicle 20d. FIG. 3 illustrates the flow of the processing when the vehicle 20a communicates with the terminal 82a and the vehicle 20d based on PC5.

In S302, the information processing apparatus 24a of the vehicle 20a recognizes non line of sight areas in the advancing direction of the vehicle 20a from the image acquired from the sensor 29a. In S304, the information processing apparatus 24a selects the risk area from among the non line of sight areas recognized in S302. For example, the information processing apparatus 24a selects, as the risk area, an area where the risk area information is not transmitted in a predetermined period of time previous to the present time among the non line of sight areas recognized in S302. The information processing apparatus 24a selects, as the risk area, an area where the vehicle 20a reaches within a predetermined period of time among the non line of sight areas recognized in S302. For example, the information processing apparatus 24a calculates a period of time required for arrival corresponding to a period of time until the vehicle 20a reaches a location in the vicinity of the non line of sight area based on a distance to the non line of sight area which is calculated from at least one of the image acquired by the sensor 29a and the distance measured by the sensor 29a and a vehicle speed measured by the vehicle speed sensor 26, and selects a line of sight area where the period of time required for arrival is within a predetermined period of time as the risk area.

In S306, the information processing apparatus 24a calculates the coordinate information of the risk area selected in S304. The information processing apparatus 24a calculates absolute coordinate information of the risk area selected in S304 based on the current location of the vehicle 20a and relative coordinates of the risk area using the vehicle 20a as the reference. The absolute coordinate information of the risk area may be geographic coordinates of the risk area. The absolute coordinate information of the risk area may include latitude information and longitude information of the risk area.

In S308, the vehicle 20a transmits the risk area information. The risk area information may include an area ID, the coordinate information of the risk area, transmission source information of the risk area information, and the period of time required for arrival. The area ID is identification information for uniquely specifying the risk area selected in S304. The area ID may be identification information decided by the information processing apparatus 24a. The transmission source information is identification information for uniquely specifying the vehicle 20a corresponding to a transmission source of the risk area information.

In S312, when the risk area information transmitted from the vehicle 20a is received, the terminal 82a determines whether the terminal 82a is located in the risk area. For example, the terminal 82a judges whether coordinates of the current location of the terminal 82a are in a region set by the coordinate information included in the risk area information. When the terminal 82a is located in the risk area, in S314, the terminal 82a transmits the response information indicating the presence of the pedestrian in the risk area to the vehicle 20a. The terminal 82a includes, in the response information, the area ID included in the risk area information received by the terminal 82a and a terminal ID for uniquely identifying the terminal 82a, and transmits the response information. In addition, in S316, the terminal 82a performs warning to the pedestrian 80a by the human machine interface (HMI) function of the terminal 82a. Note that in S312, when it is judged that the terminal 82a is not located in the risk area, the terminal 82a discards the received risk area information, does not transmit the response information, and does not output the warning.

In S322, in the vehicle 20d, when the risk area information transmitted from the vehicle 20a is received, the determination unit 270 determines whether a pedestrian is present in the risk area. For example, the information processing apparatus 24d judges whether a pedestrian is present in a region set by the coordinate information included in the risk area information based on the image acquired by the sensor 29d and the distance information. In S324, the transmission control unit 250 transmits the response information including the determination result of the determination unit 270 to the vehicle 20a. The transmission control unit 250 includes, in the response information, the area ID included in the received risk area information, the terminal ID for uniquely identifying the vehicle 20d, and presence information indicating whether a pedestrian is present in the risk area, and causes the communication apparatus 290 to transmit the response information.

In S310, when the response information transmitted from the terminal 82a is received, the information processing apparatus 24a causes the warning information to be output based on the HMI function of the information output apparatus 40. In addition, when the response information received from the vehicle 20d includes the presence information indicating the presence of the pedestrian in the risk area, the information processing apparatus 24a causes the warning information to be output based on the HMI function of the information output apparatus 40.

Figure 4:
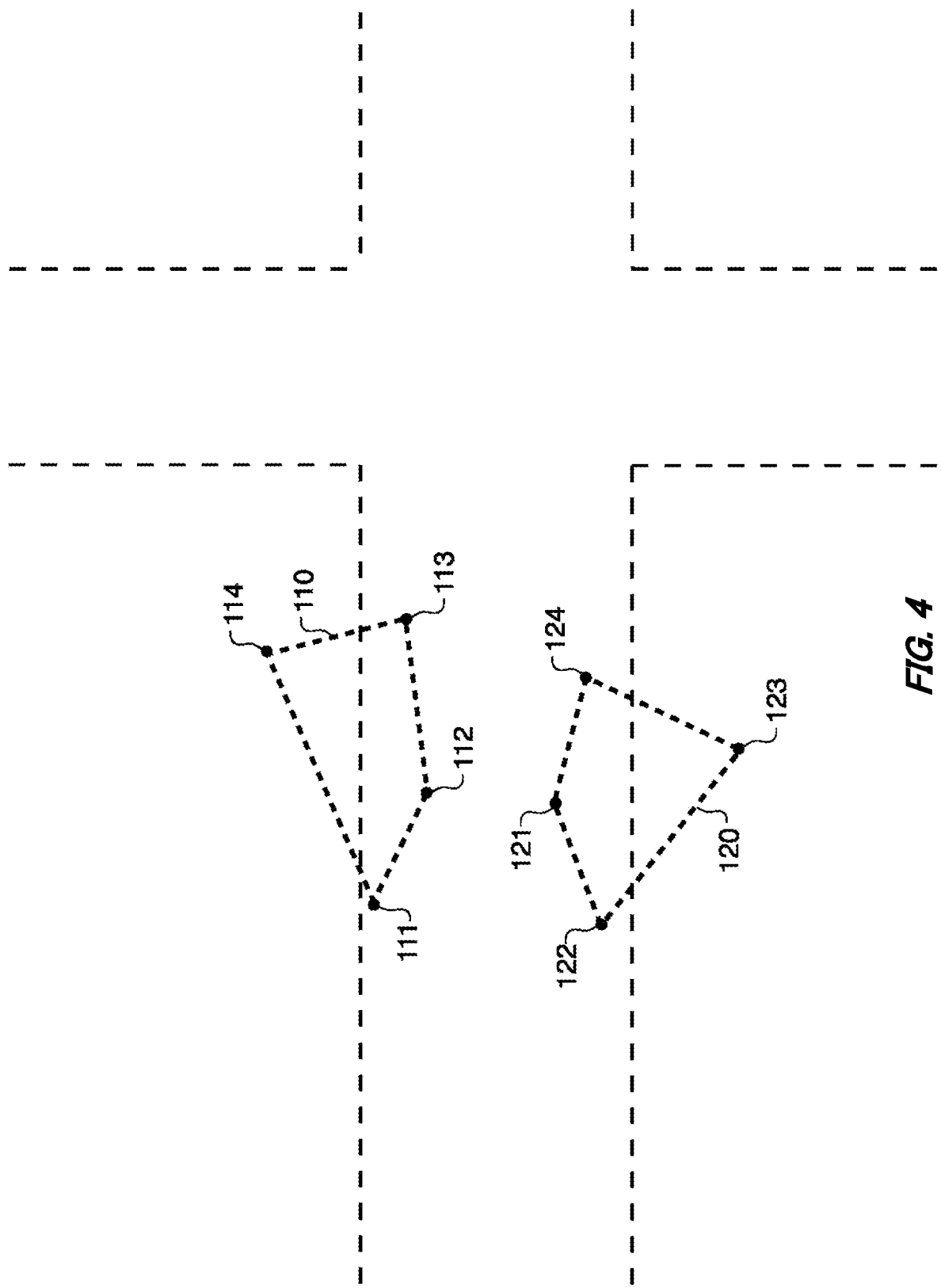
FIG. 4 conceptually illustrates location information of a risk area to be managed.

FIG. 4 conceptually illustrates the location information of the risk area to be managed by the information processing apparatus 24a. In the vehicle 20a, the information processing apparatus 24a calculates coordinates of each of four points including a point 111, a point 112, a point 113, and a point 114 which represent an outline of the area 110 judged as the risk area. The area 110 is a closed region formed by linking the coordinates of the point 111, the point 112, the point 113, and the point 114. In addition, the information processing apparatus 24a calculates coordinates of each of four points including a point 121, a point 122, a point 123, and a point 124 which represent an outline of the area 120 judged as the risk area. The area 120 is a closed region formed by linking the coordinates of the point 121, the point 122, the point 123, and the point 124. The information processing apparatus 24a stores the coordinates of each of the point 111, the point 112, the point 113, and the point 114 while being associated with the area ID assigned to the area 110. In addition, the information processing apparatus 24a stores the coordinates of each of the point 121, the point 122, the point 123, and the point 124 while being associated with the area ID assigned to the area 120.

When the vehicle 20d receives the risk area information, the determination unit 270 analyzes the image region showing an area surrounded by the four points indicated by the coordinates included in the location information from the image acquired by the camera 22, and detects a pedestrian in the area. The transmission control unit 250 transmits the response information including a detection result of the pedestrian in the area surrounded by the four points by the determination unit 270 and the area ID to the vehicle 20a corresponding to the transmission source of the risk area information. In addition, when the terminal 82 receives the risk area information, the terminal 82 judges whether the current location of the terminal 82 is included in the area surrounded by the four points indicated by the coordinates included in the location information. When the current location of the terminal 82 is included in the area surrounded by the four points, the terminal 82 transmits the response information including the area ID to the vehicle 20a corresponding to the transmission source of the risk area information.

Note that when the risk area has a circular shape, the location information of the risk area may include coordinate information of a central point of the risk area and diameter information of the risk area. When the risk area has a polygonal shape, the location information of the risk area may include coordinate information of a point serving as a reference of the polygonal shape and length information of sides such as a width and a height of the risk area. When the risk area has an elliptical shape, the location information of the risk area may include coordinate information of a central point of the risk area, a major axis, a minor axis, and azimuth angle information.

Figure 5:
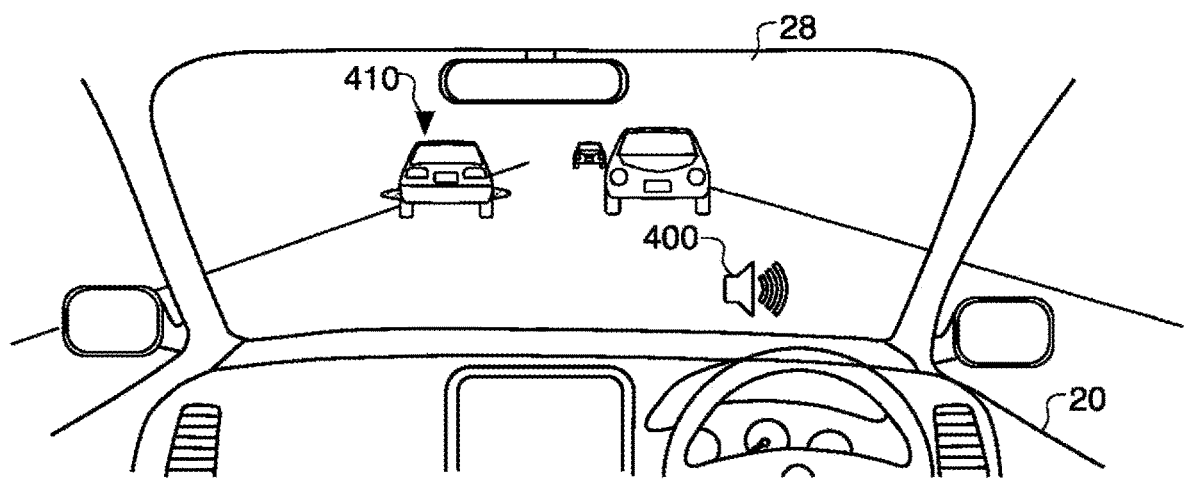
FIG. 5 illustrates one example of a display method of warning information in the vehicle 20.

FIG. 5 illustrates one example of a display method of the warning information in the vehicle 20a. Herein, descriptions will be provided while the information output apparatus 40 of the vehicle 20a includes a head-up display. When the response information received from the information processing apparatus 24d includes the presence information indicating the presence of the pedestrian in the risk area, the information processing apparatus 24a judges an area corresponding to the area ID included in the response information as the risk area of the notification target. In addition, when the response information is received from the terminal 82a, the information processing apparatus 24a judges the area corresponding to the area ID included in the response information as the risk area of the notification target.

The information processing apparatus 24a causes the information output apparatus 40 of the vehicle 20a to project light for forming a mark 400 as the warning information indicating the presence of the pedestrian in the risk area. In addition, the information processing apparatus 24a causes the information output apparatus 40 of the vehicle 20a to output light for forming a mark 410 in a display region corresponding to the location of the risk area of notification target. The mark 410 is an object indicating the location of the risk area. The information output apparatus 40 projects the light for forming the mark 400 and the mark 410 towards a reflection member disposed on a wind shield 28 of the vehicle 20. Note that the information output apparatus 40 may output the warning information using a sound or a character.

Figure 6:
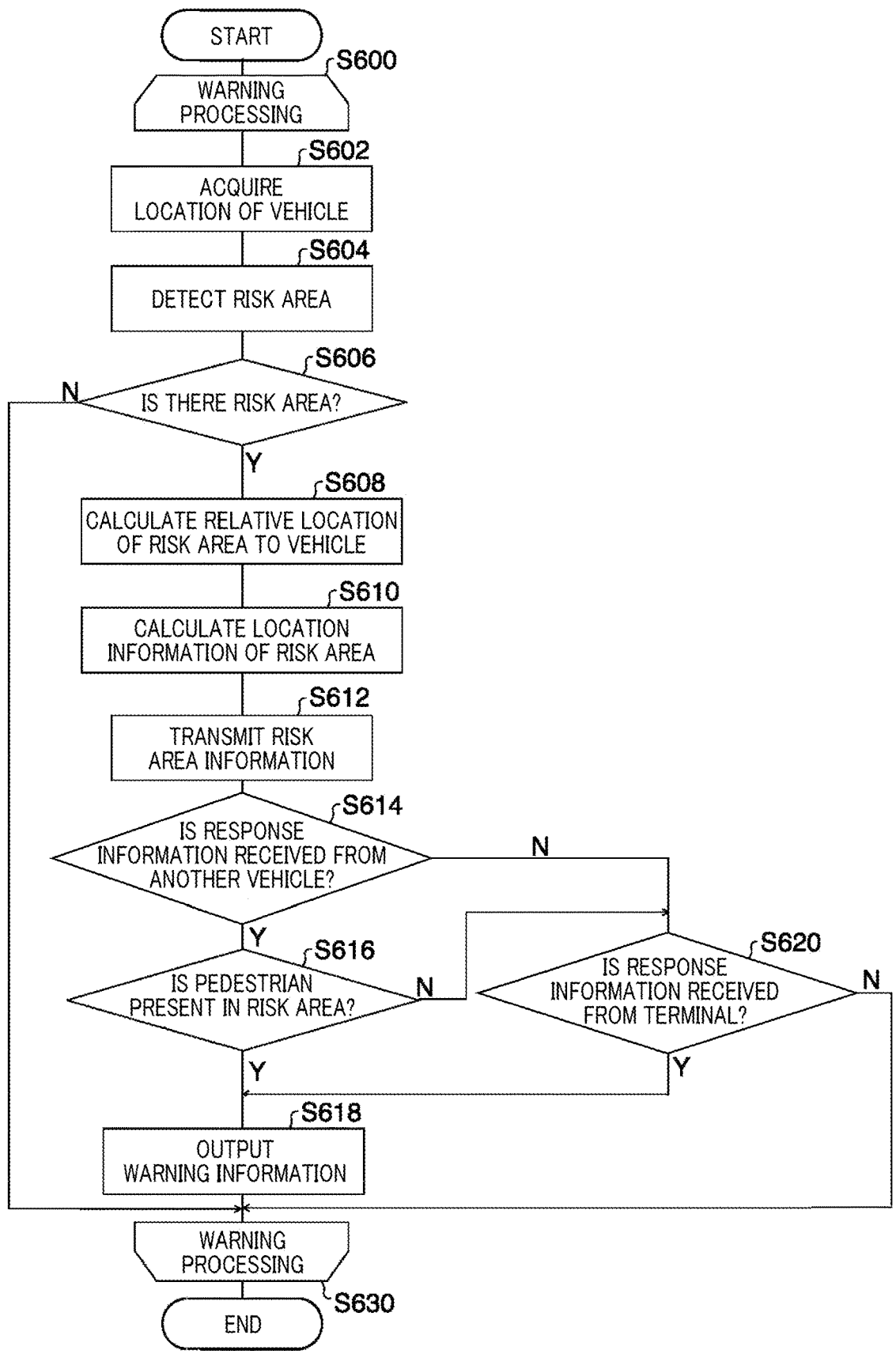
FIG. 6 illustrates a flowchart related to an information processing method executed by an information processing apparatus 24.

FIG. 6 illustrates a flowchart related to an information processing method executed by the information processing apparatus 24a in the vehicle 20a. The information processing apparatus 24a repeatedly executes processing from a start point S600 of a loop of warning processing to an end point S630 of the loop of the warning processing. When a predetermined condition is satisfied in at least one of the start point S600 of the warning processing and the end point S630 of the warning processing, the information processing apparatus 24a ends the loop of the warning processing.

In S602, the information processing apparatus 24a acquires the location information acquired by the sensor 29a as the current location of the vehicle 20. In S604, the information processing apparatus 24a detects the risk area. For example, the information processing apparatus 24a may detect the risk area based on object information extracted from the image acquired by the sensor 29a and object information acquired by the sensor 29a. The information processing apparatus 24a may also detect the risk area based on location information of a building which is included in map information, the current location of the vehicle 20a, and orientation information of the vehicle 20a.

In S606, the information processing apparatus 24a judges whether a risk area is detected. When the risk area is not detected, the flow shifts to the processing in S630. When the risk area is detected, in S608, the information processing apparatus 24a calculates relative location of the risk area using the location of the vehicle 20a as the reference. In S610, the information processing apparatus 24a calculates the location information of the risk area. For example, the information processing apparatus 24a calculates the coordinate information of the risk area based on coordinate information of the relative location of the risk area which is calculated in S608 and coordinate information of the current location of the vehicle 20 which is detected in S602. In S612, the information processing apparatus 24a causes the communication apparatus 290 of the vehicle 20a to transmit the location information of the risk area which is calculated in S610 and the risk area information including the area ID.

Note that the information processing apparatus 24a may include, in the risk area information, designation information for designating the other vehicle 20 that is to detect whether a pedestrian is present in the risk area. For example, there are some cases where an area is a risk area for a passenger vehicle, but the area is not a risk area for a vehicle with a high vehicle height such as a heavy duty truck or a bus traveling behind the passenger vehicle. For this reason, the information processing apparatus 24a may include, in the risk area information as a condition to be satisfied by the other vehicle 20 that detects whether a pedestrian is present in the risk area, information for specifying a vehicle height of the vehicle 20 or a type of the vehicle 20. In addition, the other vehicle 20 traveling in a direction intersecting with the advancing direction of the vehicle 20 is likely to be able to visibly recognize the risk area. For this reason, information processing apparatus 24a may include, in the risk area information as a condition to be satisfied by the other vehicle 20 that detects whether a pedestrian is present in the risk area, information for designating the advancing direction of the vehicle 20. The information processing apparatus 24a may include, in the risk area information, information for specifying a location of the vehicle as a condition to be satisfied by the other vehicle 20 that detects whether a pedestrian is present in the risk area. For example, when the vehicle 20d receives the risk area information, in a case where the vehicle 20d satisfies a condition included in the risk area information, the determination unit 270 of the vehicle 20d may detect whether a pedestrian is present in the risk area, and transmit the response information.

In S614, the information processing apparatus 24a judges whether the response information including the area ID is received from the other vehicle 20. When the response information is received, in S616, the information processing apparatus 24a judges whether a pedestrian is present in the risk area based on the presence information included in the response information. When it is judged that the pedestrian is present in the risk area, in S618, the information processing apparatus 24a causes the information output apparatus 40 of the vehicle 20a to output the warning information.

In the judgement in S614, when the response information including the area ID is not received from the other vehicle 20, in S620, the information processing apparatus 24a judges whether the response information including the area ID is received from the terminal 82. When the response information is received from the terminal 82, the flow shifts to the processing in S618. When the response information is not received from the terminal 82, the flow shifts to the processing in S630.

Figure 7:
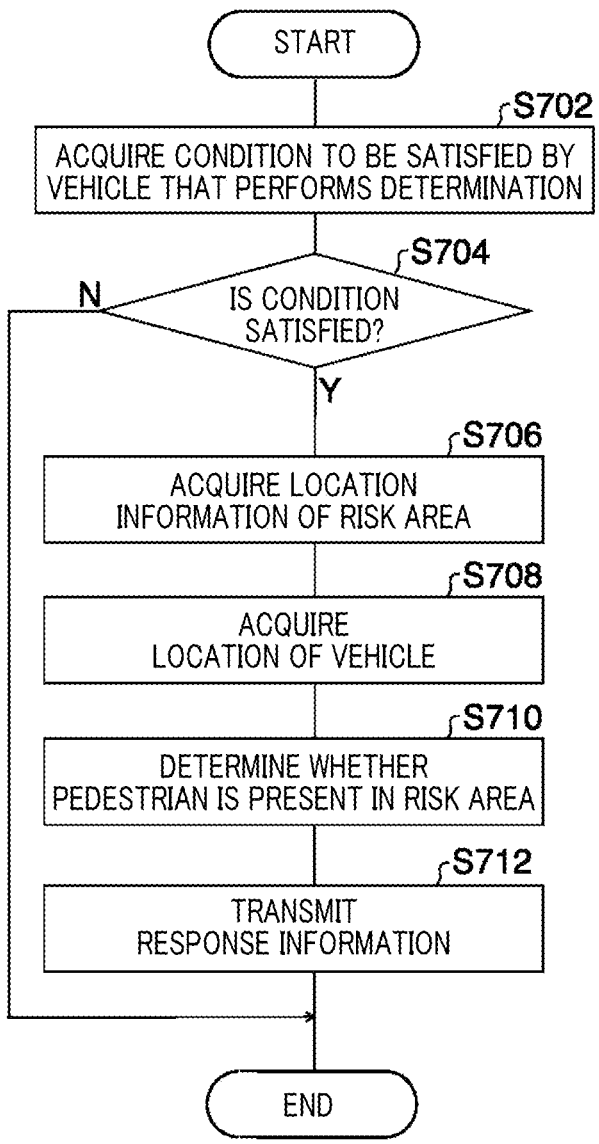
FIG. 7 illustrates a flowchart related to the information processing method executed by the information processing apparatus 24.

FIG. 7 is a flowchart related to an information processing method executed by the information processing apparatus 24d. This flowchart is started when the risk area information from the vehicle 20a is received based on the control of the reception control unit 260.

In S702, the determination unit 270 acquires a condition that is to be satisfied by the vehicle 20 that determines the presence of the pedestrian 80 from the risk area information. In S704, the determination unit 270 judges whether the vehicle 20d satisfies the condition acquired in S702. When the vehicle 20d does not satisfy the condition acquired in S702, the processing in this flowchart is ended.

In S706, the determination unit 270 acquires the location information of the risk area from the risk area information. In S708, the location information acquisition unit 230 acquires the location information of the vehicle 20d. In S710, the determination unit 270 performs processing for determining whether a pedestrian is present in the risk area based on the image acquired by the camera 22. In S712, the transmission control unit 250 transmits the response information including the determination result of S710 to the vehicle 20a. Note that the determination result included in the response information may be a determination result indicating that the pedestrian is present in the risk area. The determination result may be a determination result indicating that the pedestrian is absent in the risk area.

Note that in the embodiment described above, the mode has been described in which the vehicle 20 directly transmits the risk area information to the other vehicle 20 and the terminal 82. However, a mode can also be adopted in which the processing for judging whether the pedestrian is present in the risk area is performed via the base station 50. For example, when the risk area information is received, the base station 50 may select the terminal 82 corresponding to the transmission destination of the risk area information based on the location information included in the risk area information and the location information of the terminal 82 managed by the base station 50. When the response information is received from the terminal 82, the base station 50 may transmit the response information to the vehicle 20 corresponding to the transmission source of the risk area information. When it is judged that the terminal 82 is present in the risk area based on the location information included in the risk area information and the location information of the terminal 82 managed by the base station 50, the base station 50 may transmit the response information to the vehicle 20 corresponding to the transmission source of the risk area information. In addition, when the risk area information is received, the base station 50 may select the other vehicle 20 corresponding to the transmission destination of the risk area information based on the location information included in the risk area information and the location information of the other vehicle 20 managed by the base station 50. When the response information is received from the other vehicle 20, the base station 50 may transmit the response information to the vehicle 20 corresponding to the transmission source of the risk area information.

In accordance with the warning system 10 described above, when the location information of the non line of sight area for a certain vehicle 20 is transmitted, another vehicle 20 can judge whether a pedestrian is present in the non line of sight area for the certain vehicle 20. In addition, since it is found out that its own terminal is located in the non line of sight area of the vehicle 20, the terminal 82 can output the warning information to the pedestrian 80. With this configuration, traffic safety can be increased. In addition, when the location information of the risk area of a certain vehicle 20 is received, in a case where the image information acquired in the past within a predetermined period of time exists, the other the vehicle 20 may transmit the image information together with acquired time information to the vehicle 20.

Note that the vehicle 20 is one example of transport equipment. The transport equipment includes a motor vehicle such as a passenger vehicle or a bus, a saddle type vehicle, a bicycle, or the like. In addition, the movable object includes, in addition to a person, transport equipment such as a motor vehicle like a passenger vehicle or a bus, a saddle type vehicle, or a bicycle.

Figure 8:
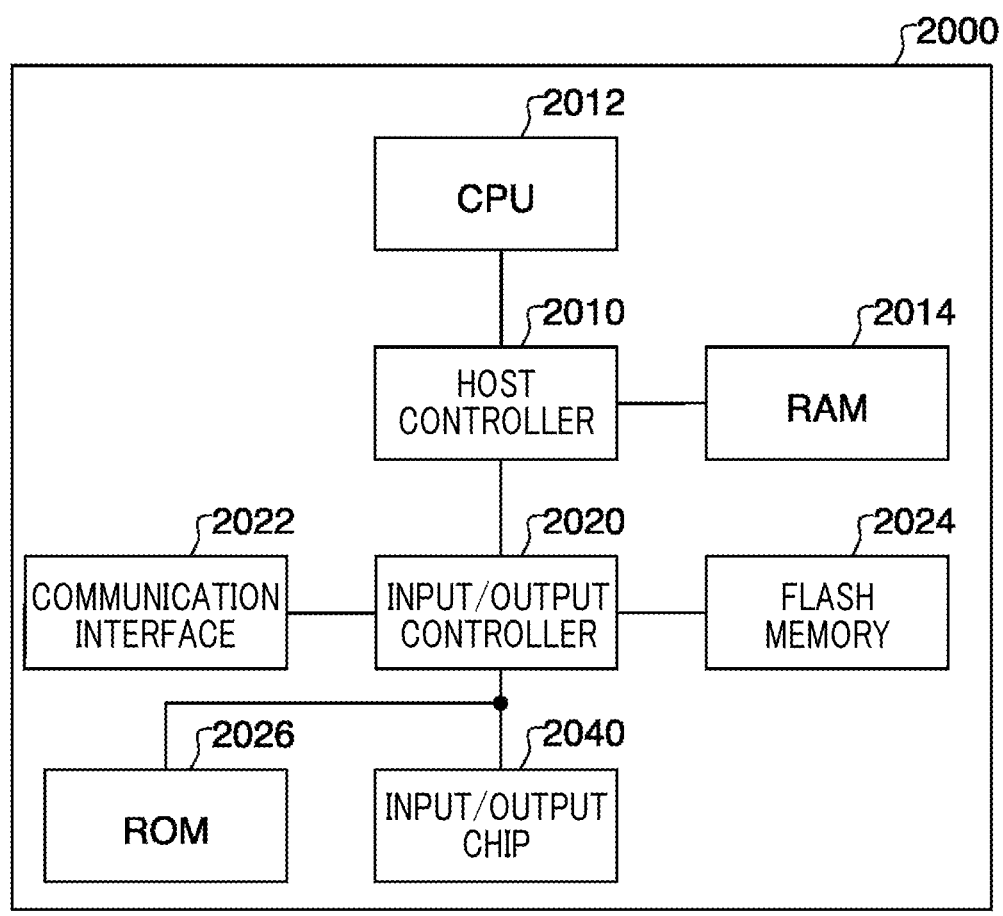
FIG. 8 illustrates an example of a computer 2000.

FIG. 8 illustrates an example of a computer 2000 where a plurality of embodiments of the present invention may be entirely or partially embodied. Programs installed in the computer 2000 can cause the computer 2000 to: function as apparatuses such as the information processing apparatus 24 according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, a high-definition multimedia interface (HDMI (registered trademark)) port.

The programs are provided via a network or a computer-readable medium such as a CD-ROM, a DVD-ROM, or a memory card. The RAM 2014, the ROM 2026, or the flash memory 2024 is an example of the computer-readable medium. The programs are installed in the flash memory 2024, the RAM 2014 or the ROM 2026, and are executed by the CPU 2012. Information processing written in these programs is read by the computer 2000, and provides cooperation between the programs and the various types of hardware resources described above. An apparatus or a method may be configured by implementing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing, based on processing written in the communication program. The communication interface 2022, under the control of the CPU 2012, reads transmission data stored in a transmission buffer processing region provided in a recording medium such as the RAM 2014 and the flash memory 2024, sends the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 or the like, to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and writes back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of said plurality of entries, an entry with the attribute value of the first attribute specified that meets a condition, read the attribute value of the second attribute stored in said entry, and thereby acquire the attribute value of the second attribute associated with the first attribute meeting a predetermined condition.

The programs or software module described above may be stored on the computer 2000 or in a computer-readable medium near the computer 2000. A recording medium such as a hard disk or RAM provided in a server system connected to a dedicated communication network or the Internet can be used as the computer-readable medium. The programs stored in the computer-readable medium may be provided to the computer 2000 via the network.

The program installed in the computer 2000 and causing the computer 2000 to function as the information processing apparatus 24 may instruct the CPU 2012 or the like to cause the computer 2000 to function as each unit of the information processing apparatus 24. The information processing written in these programs are read by the computer 2000 to cause the computer to function as each unit of the information processing apparatus 24, which is specific means realized by the cooperation of software and the various types of hardware resources described above. Then, these specific means implement operations or processing of information according to the intended use of the computer 2000 in the present embodiment, so that the information processing apparatus 24 is constructed as a specific information processing apparatus according to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable medium may include any tangible device capable of storing an instruction executed by an appropriate device, so that the computer-readable medium having the instruction stored thereon constitutes at least a part of a product including an instruction that may be executed in order to provide means to execute an operation specified by a processing procedure or a block diagram. Examples of the computer-readable media may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 warning system
20 vehicle
21 radar
22 camera
24 information processing apparatus
25 GNSS reception unit
26 vehicle speed sensor
28 wind shield
29 sensor
30 drive assist control apparatus 40 information output apparatus
50 base station
70, 72 road
80 pedestrian
82 terminal
90 building
110, 120, 130 area
111, 112, 113, 114, 121, 122, 123, 124 point
210 image acquisition unit
220 detection unit
230 location information acquisition unit
250 transmission control unit
260 reception control unit
270 determination unit
280 storage unit
290 communication apparatus
2000 computer
2010 host controller
2012 CPU
2014 RAM
2020 input/output controller
2022 communication interface
2024 flash memory
2026 ROM
2040 input/output chip

What is claimed is:

1. A communication control apparatus installed in a movable object, comprising:
at least one processor and
computer readable instructions which when executed by the at least one processor cause the at least one processor to perform operations such that the at least one processor is at least configured to
acquire an image from a camera installed in the movable object;
control direct reception of risk area information including location information from another movable object, wherein the risk area information relates to a risk area that was identified by the another movable object as a risk area of its own;
determine whether a notification target is present in a region based on the location information included in the risk area information directly received from the another movable object, based on the image acquired by the camera; and
control direct transmission of a determination result of determining whether the notification target is present in the region to the another movable object.

2. The communication control apparatus according to claim 1, wherein:
the location information is a plurality of pieces of coordinate information indicating an area where it is to be determined on whether a notification target is present; and
the at least one processor is further configured to determine whether the notification target is present in an area including the plurality of pieces of coordinate information.

3. The communication control apparatus according to claim 1, wherein:
the location information includes coordinate information indicating an area where it is to be determined on whether a notification target is present, and distance information from the coordinate information; and the at least one processor is further configured to determine whether the notification target is present in an area set by the coordinate information and the distance information.

4. The communication control apparatus according to claim 1, wherein
the location information indicates an area where a presence of the notification target cannot be recognized from the another movable object.

5. The communication control apparatus according to claim 1, wherein
the notification target includes at least one of a person and a vehicle.

6. The communication control apparatus according to claim 1, wherein:
the risk area information includes designation information indicating a movable object that is to transmit the determination result; and
when it is judged that the determination result is to be transmitted based on the designation information, the at least one processor is further configured to determine whether a notification target is present in a region based on the location information included in the risk area information.

7. The communication control apparatus according to claim 6, wherein
the designation information includes information indicating at least one of a location, an orientation, an advancing direction, and a type of the movable object that is to transmit the determination result.

8. The communication control apparatus according to claim 2, wherein
the location information indicates an area where a presence of the notification target cannot be recognized from the another movable object.

9. The communication control apparatus according to claim 3, wherein
the location information indicates an area where a presence of the notification target cannot be recognized from the another movable object.

10. The communication control apparatus according to claim 2, wherein
the notification target includes at least one of a person and a vehicle.

11. The communication control apparatus according to claim 4, wherein
the notification target includes at least one of a person and a vehicle.

12. The communication control apparatus according to claim 8, wherein
the notification target includes at least one of a person and a vehicle.

13. The communication control apparatus according to claim 2, wherein
the risk area information includes designation information indicating a movable object that is to transmit the determination result; and
when it is judged that the determination result is to be transmitted based on the designation information, the at least one processor is further configured to determine whether a notification target is present in a region based on the location information included in the risk area information.

14. The communication control apparatus according to claim 4, wherein the risk area information includes designation information indicating a movable object that is to transmit the determination result; and when it is judged that the determination result is to be transmitted based on the designation information, the at least one processor is further configured to determine whether a notification target is present in a region based on the location information included in the risk area information.

15. The communication control apparatus according to claim 13, wherein the designation information includes information indicating at least one of a location, an orientation, an advancing direction, and a type of the movable object that is to transmit the determination result.

16. The communication control apparatus according to claim 14, wherein the designation information includes information indicating at least one of a location, an orientation, an advancing direction, and a type of the movable object that is to transmit the determination result.

17. The communication control apparatus according to claim 1, wherein the movable object is a vehicle.

18. A vehicle comprising:

the communication control apparatus according to claim 17.

19. A non-transitory computer-readable storage medium having stored thereon a program that, when executed by a computer installed in a movable object, causes the computer to perform operations comprising:

acquiring an image from a camera installed in the movable object;

controlling direct reception of risk area information including location information from another movable object, wherein the risk area information relates to a risk area that was identified by the another movable object as a risk area of its own;

determining whether a notification target is present in a region based on the location information included in the risk area information directly received from the another movable object, based on the image acquired from the camera; and controlling direct transmission of a determination result of determining whether the notification target is present in the region to the another movable object.

20. A communication control method comprising:

acquiring, by a communication control apparatus installed in a movable object, an image from a camera installed in the movable object;

controlling, by the communication control apparatus, direct reception of risk area information including location information from another movable object, wherein the risk area information relates to a risk area that was identified by the another movable object as a risk area of its own;

determining, by the communication control apparatus, whether a notification target is present in a region based on the location information included in the risk area information directly received from the another movable object, based on the image acquired from the camera; and controlling, by the communication control apparatus, direct transmission of a determination result of the determining step to the another movable object.

* * * * *